(12) United States Patent
Lan et al.

(10) Patent No.: US 7,530,561 B2
(45) Date of Patent: *May 12, 2009

(54) PAPER-PICKUP CLUTCH OF AUTOMATIC PAPER-FEEDING DEVICE

(76) Inventors: Chia-Tsui Lan, 2F., No.17, Ren-al St., Gueishan Township, Taoyuan County 333 (TW); Ping-Hung Kuo, No.8, Alley 12, Lane 370, Wuchang St., Songshan District, Taipei City 105 (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/691,976

(22) Filed: Mar. 27, 2007

(65) Prior Publication Data

US 2007/0235918 A1    Oct. 11, 2007

Related U.S. Application Data

(63) Continuation of application No. 10/964,453, filed on Oct. 13, 2004, now Pat. No. 7,252,283.

(30) Foreign Application Priority Data

Nov. 13, 2003    (TW) ............................ 92131791 A (51) Int. Cl.
*B65H 3/00* (2006.01)
(52) U.S. Cl. .......................... 271/34; 271/18
(58) Field of Classification Search .................. 271/34, 271/114–118, 10.13; 464/45; 192/56.6
See application file for complete search history.

(56) References Cited

U.S. PATENT DOCUMENTS

| | | |
|---|---|---|
| 521,677 A | 6/1894 | Smith |
| 584,483 A | 6/1897 | Richards |
| 1,128,942 A | 2/1915 | Brown |
| 1,425,305 A | 8/1922 | Clark |
| 1,708,378 A | 4/1929 | Dale |
| 2,389,772 A | 11/1945 | Samuel |
| 2,561,830 A | 7/1951 | Vanderzee |
| 3,387,503 A | 6/1968 | Rychlik |
| 3,987,687 A | 10/1976 | Bland et al. |

(Continued)

OTHER PUBLICATIONS

Sclater, N., Chironis, N.P. Mechanisms and Mechanical Devices Sourcebook (3rd Edition), McGraw-Hill, pp. 342-346, 2001.

*Primary Examiner*—Patrick H Mackey
*Assistant Examiner*—Jeremy Severson
(74) *Attorney, Agent, or Firm*—Workman Nydegger (57) ABSTRACT

A paper-pickup clutch of an automatic paper-feeding device includes a clamping member and a clamping-force adjusting member and can be applied to image processors such as printers, copiers or scanners. The automatic paper-feeding device includes a shaft and a paper-pickup mechanism transmitted to picking up paper by the shaft. The paper-pickup clutch provides a bi-directional clutch function by moving the clamping member toward or away from the paper-pickup mechanism with the clamping-force adjusting member in order to adjust the clamping force of the clamping member working on the paper-pickup mechanism to a certain level. With the certain level of clamping force, the paper-pickup mechanism sustains against paper to be fed and self-rotates with the rotation of the shaft in a first direction for feeding paper and rotates with the shaft in a second direction for releasing paper without further changing the state of the paper-pickup clutch.

44 Claims, 4 Drawing Sheets

U.S. PATENT DOCUMENTS

| | | | |
|---|---|---|---|
| 4,010,831 A | 3/1977 | Reuter | |
| 4,625,955 A | 12/1986 | Snellman | |
| 4,754,961 A | 7/1988 | Tokuda et al. | |
| 4,919,243 A | 4/1990 | Flotow | |
| 4,938,466 A | 7/1990 | Correa | |
| 4,946,016 A | 8/1990 | Torres | |
| 5,234,208 A * | 8/1993 | Bandura et al. | 271/34 |
| 5,478,067 A | 12/1995 | Requena et al. | |
| 5,493,968 A * | 2/1996 | Ishikawa | 101/118 |
| 5,775,823 A | 7/1998 | Bekki et al. | |
| 5,842,694 A | 12/1998 | Brooks | |
| 5,966,158 A | 10/1999 | Ebata et al. | |
| 6,089,561 A | 7/2000 | Marshall et al. | |
| 6,203,005 B1 | 3/2001 | Bednarek et al. | |
| 6,206,367 B1 | 3/2001 | Jo | |
| 6,352,256 B1 | 3/2002 | Hsieh | |
| 6,540,220 B2 | 4/2003 | Kuo et al. | |
| 6,581,924 B2 | 6/2003 | Gaarder et al. | |
| 6,588,743 B2 | 7/2003 | Yap | |
| 6,616,136 B1 | 9/2003 | Huang et al. | |
| 6,663,097 B2 | 12/2003 | Bantle | |
| 6,666,446 B2 | 12/2003 | Gaarder et al. | |
| 6,877,736 B2 | 4/2005 | Chung | |
| 7,004,464 B2 | 2/2006 | Hattori et al. | |
| 7,198,265 B2 | 4/2007 | Chelvayohan et al. | |
| 2003/0080499 A1 | 5/2003 | Yap | |
| 2005/0236764 A1 | 10/2005 | Saeki et al. | |
| 2006/0049572 A1 | 3/2006 | Miyazawa | |
| 2007/0126171 A1 * | 6/2007 | Takeuchi et al. | 271/121 |
| 2008/0190726 A1 * | 8/2008 | Sayama | 192/107 R |

* cited by examiner

PAPER-PICKUP CLUTCH OF AUTOMATIC PAPER-FEEDING DEVICE

CROSS REFERENCE TO RELATED APPLICATIONS

This application is a continuation of U.S. Ser. No. 10/964,453, filed on Oct. 13, 2004, now U.S. Pat. No. 7,252,283 which in turn claims priority to TW Application No. 092131791 filed on Nov. 13, 2003.

FIELD OF THE INVENTION

The present invention relates to a clutch structure, and more particularly to a paper-pickup clutch of an automatic paper-feeding device. The present invention also relates to an automatic paper-feeding device having an improved paper-pickup clutch means.

BACKGROUND OF THE INVENTION

As the development of image-processing techniques, the image output machines such as printers, copiers, image scanners and multifunctional machines have become more and more popular. Various automatic paper-feeding mechanisms for quickly and steadily feeding paper sheets one by one are thus developed for use with the image output machines to facilitate the image output operations. As understood, the most annoying situation occurring in an automatic paper-feeding device is probably that no paper or more than one sheet of paper is picked in a single feeding operation. It may result in idle feeding or paper stocking problem. Generally, the above situations result from the imbalance between paper pickup and paper release operations. Therefore, it is important to provide an automatic paper-feeding device that has well-controlled paper-feeding mechanism.

Figure 1:
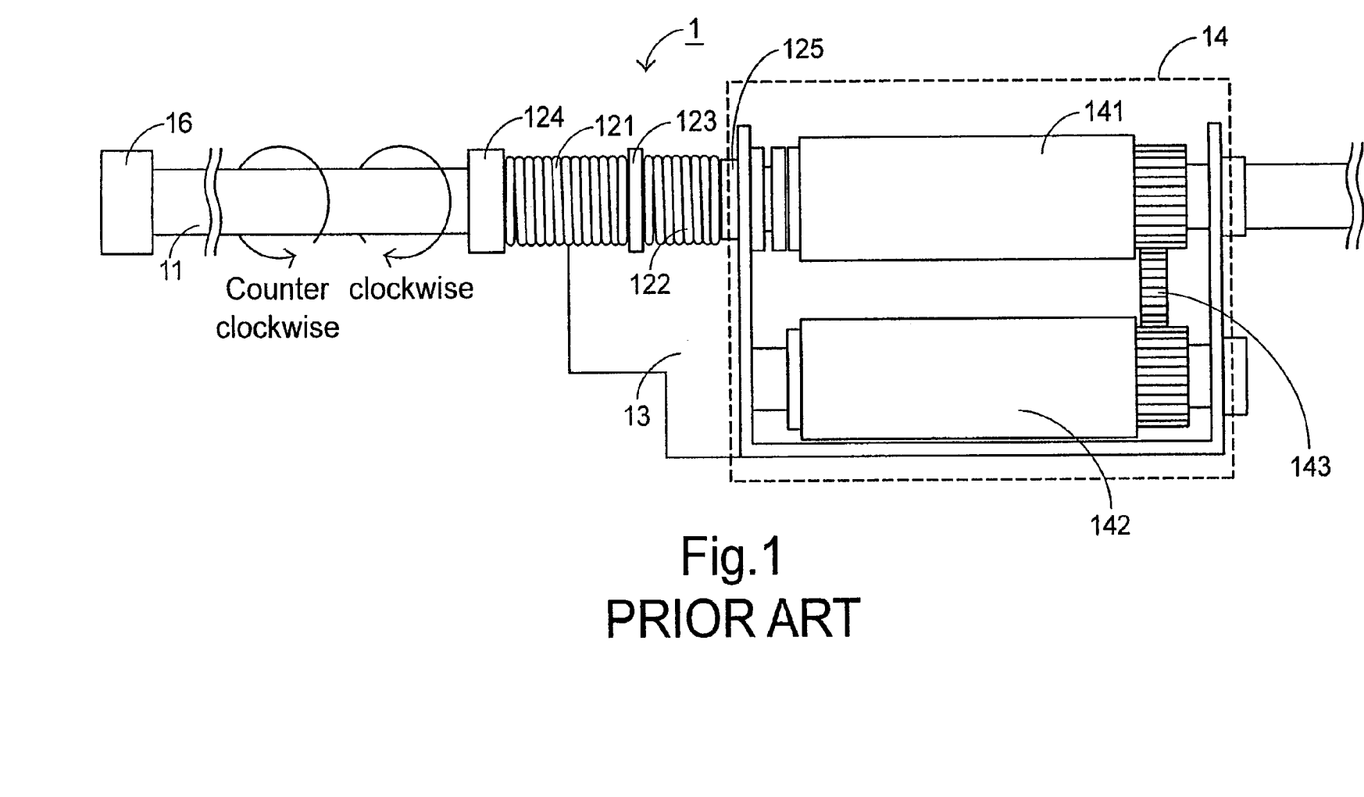
FIG. 1 is a schematic diagram showing a conventional paper-feeding device.

Please refer to FIG. 1. A conventional automatic paper-feeding device used in an image processor is schematically shown. In the paper-feeding device, a one-way clutch mechanism is employed. The one-way clutch mechanism is implemented with a shaft 11, a clockwise torsional clutch 121, a counterclockwise torsional clutch 122, a paper-pickup arm 13 and a paper-delivering roller set 14. The paper-delivering roller set 14 includes a first roller 141, a gear set 143 and a second roller 142. The first and second rollers 141 and 142 rest on the paper sheets (not shown) to be fed in a feeding mode. When the first roller 141 is transmitted by and rotates with the shaft 11, the second roller 142 is synchronously transmitted to rotate in the same direction as the first roller 141 via the gear set 143. Then, the rotating first and second rollers 141 and 142 will transmit the paper sheet in contact therewith to move on the condition that the friction force between the rollers 141 and 142 and paper is great enough to inhibit from idle rotation of the rollers. The friction force, on the other hand, should not be so great as to pick up more than one paper sheet at the same time. After the topmost paper sheet is picked up and fed, the paper-delivering roller set 14 is switched from the feeding mode in contact with the topmost paper sheet to a release mode separate from that paper sheet. Meanwhile, the paper-delivering roller set 14 is moved back to pick up and feed next topmost paper sheet.

The aforementioned purposes can be achieved by the clockwise torsional clutch 121 and the counterclockwise torsional clutch 122. The clockwise and counterclockwise torsional clutches 121 and 122, which are implemented with springs, are sleeved on the shaft 11. The clockwise torsional clutch 121 has a fixed end 124 fixed on the shaft 11 and the counterclockwise torsional clutch 122 having a fixed end 125 securely coupled to the paper delivering roller set 14. Between the clockwise torsional clutch 121 and the counterclockwise torsional clutch 122, a coupling member 123 is arranged to couple the above elements to the paper-pickup arm 13. Assuming that the rotation direction of the shaft 11 and the rollers 141 and 142 in the feeding mode is the clockwise direction, the shaft 11 and the rollers 141 and 142 rotate in the counterclockwise direction in the release mode.

When the shaft 11 rotates in the counterclockwise direction, the counterclockwise torsional clutch 122, due to the pulling effect of the fixed end 125, becomes tight on the shaft 11 so as to synchronously move with the shaft 11. Meanwhile, the paper delivering roller set 14 securely coupled to the fixed end 125 of the counterclockwise torsional clutch 122 is transmitted to synchronously rotate with the counterclockwise rotation of the shaft 11 as a whole. The paper delivering roller set 14 thus rotates back to feed next paper sheet.

For feeding a next paper sheet, the shaft 11 is switched to rotate clockwise. Meanwhile, the counterclockwise torsional clutch 122 is released and the clockwise torsional clutch 121 becomes tightened around the shaft 11 because of the pulling force of the fixed end 124 onto the shaft 11. The clamp effect of the clockwise torsional clutch 121 on the shaft 11 transmit the entire the paper delivering roller set 14 to rotate clockwise with the shaft 11 until the paper delivering roller set 14 sustains against the paper sheets. When the paper delivering roller set 14 has rested on the topmost paper sheet and the shaft 11 keeps rotating clockwise, the paper delivering roller set 14 can not rotate further. Therefore, the continuous clockwise rotation of the shaft 11 overcomes the frictional force between the shaft 11 and the clockwise torsional clutch 121 so as to transmit the rollers 141 and 142 to rotate synchronously, thereby feeding next paper sheet.

The aforementioned paper-pickup mechanism, although capable of achieving the paper picking and feeding purposes, is disadvantageous in manufacturing and maintenance cost and laboring. For example, at least two torsional springs are required to implement the above mechanism. In addition, since the torsion adjustment is the key point for switching the feeding mode and release mode, the control of the torsion-state change is very critical. In other words, the clockwise and counterclockwise torsional clutches 121 and 122 have to be finely manufactured and precisely controlled. Once the long-term or improper use of the springs serving as the clockwise and counterclockwise torsional clutches 121 and 122 results in elastic fatigue or any other damage, the repairing or replacing work of the springs is costly.

SUMMARY OF THE INVENTION

The present invention provides a paper-pickup clutch, which is cost effective and easy to be assembled. Moreover, the paper-pickup clutch can be tuned after the assembling is accomplished to assure of proper clutch control at any time.

A first aspect of the present invention relates to a paper-pickup clutch of an automatic paper-feeding device. The automatic paper-feeding device comprises a shaft and a paper-pickup mechanism sleeved on the shaft. The paper-pickup mechanism sustains against paper to be fed and self-rotating with the rotation of the shaft in a first direction for feeding paper and rotating with the shaft in a second direction for releasing paper. The paper-pickup clutch comprises a clamping member sleeved on the shaft beside the paper-pickup mechanism and exerting a desired level of clamping force on the paper-pickup mechanism for allowing the paper-pickup mechanism to self-rotate with the rotation of the shaft in the first direction after sustaining against the paper to be fed and to rotate with the shaft in the second direction; and a clamping-force adjusting member sleeved on the shaft beside the clamping member and moving the clamping member toward or away from the paper-pickup mechanism in response to an external force in order to adjust the clamping force to the desired level.

Preferably, the clamping member includes two sets of friction discs sleeved on the shaft and disposed at opposite sides of the paper-pickup mechanism. More preferably, each set of the friction discs includes optional stainless steel plates and plastic steel plates which are alternately arranged.

In an embodiment, the clamping-force adjusting member includes a screw coupler securely sleeved on the shaft and a screw nut movably sleeved on the screw coupler and screwed to urge the clamping member against the paper-pickup mechanism to various extents, thereby adjusting the clamping force to the desired level.

In an embodiment, the shaft has a threaded portion and the clamping-force adjusting member includes a screw nut movably sleeved on the thread portion and screwed to urge the clamping member against the paper-pickup mechanism to various extents, thereby adjusting the clamping force to the desired level.

Preferably, the clamping-force adjusting member is confined with two bolts arranged at both sides thereof to avoid dislocation.

According to a second aspect of the present invention, an automatic paper- feeding device comprises a shaft; a paper-pickup mechanism sleeved on the shaft, the paper-pickup mechanism sustaining against paper to be fed and self-rotating with the rotation of the shaft in a first direction for feeding paper and rotating with the shaft in a second direction for releasing paper; and a paper-pickup clutch. The paper-pickup clutch comprises a clamping member sleeved on the shaft beside the paper-pickup mechanism and exerting a desired level of clamping force on the paper-pickup mechanism for allowing the paper-pickup mechanism to self-rotate with the rotation of the shaft in the first direction after sustaining against the paper to be fed and to rotate with the shaft in the second direction; and a clamping-force adjusting member sleeved on the shaft beside the clamping member and moving the clamping member toward or away from the paper-pickup mechanism in response to an external force in order to adjust the clamping force to the desired level.

In an embodiment, the paper-pickup mechanism comprises a base; a first roller coupled to the base and sleeved on and rotating with the shaft; a paper-delivering belt enclosing the base and the first roller and transmitted by the first roller to rotate; and a second roller coupled to the base inside the paper-delivering belt and rotating with the first roller via the transmission of the paper-delivering belt.

For example, the automatic paper-feeding device can be used in a printer, a copier, an image scanner or a multifunctional machine.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION

Figure 2A:
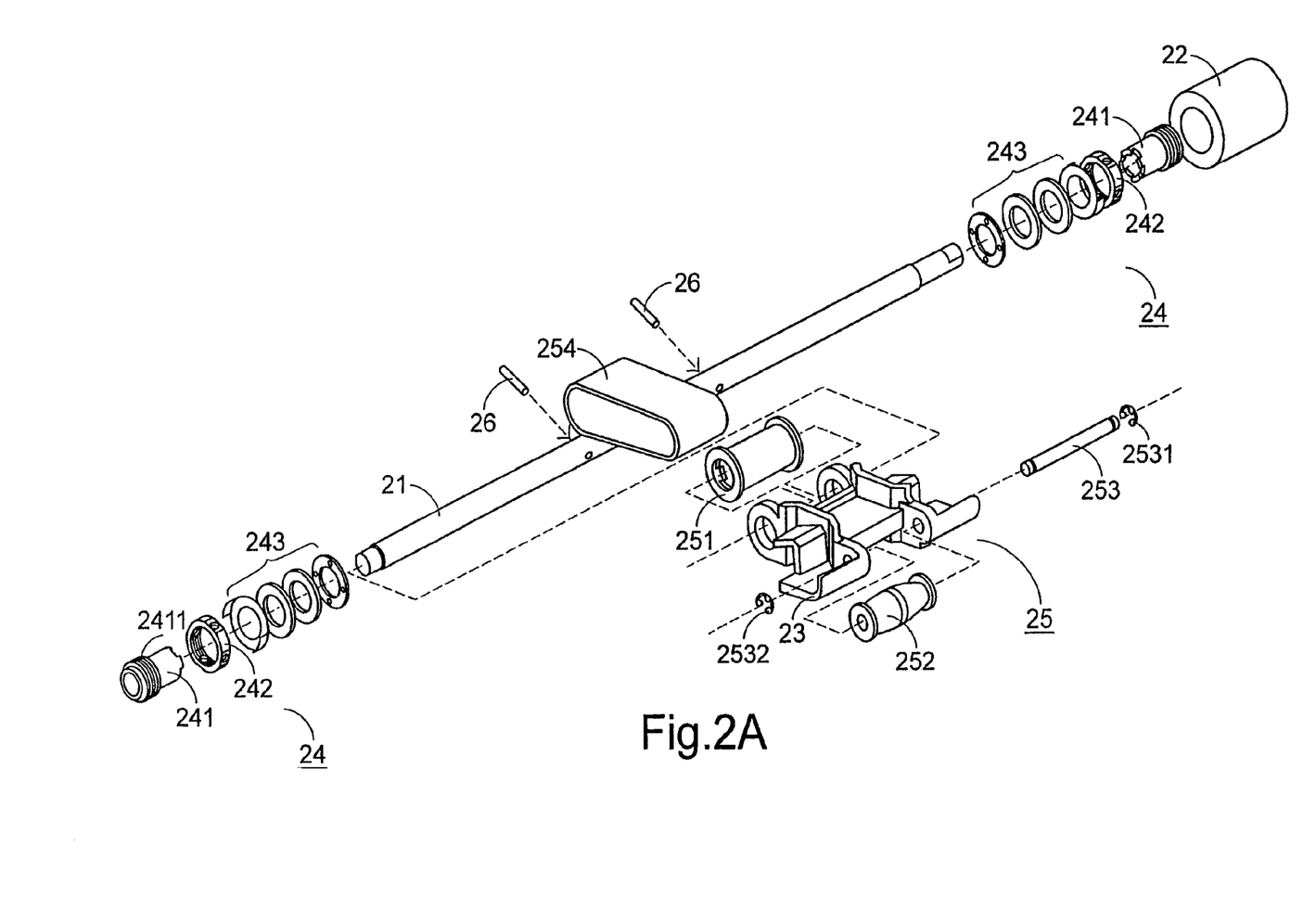
FIG. 2A is a schematic resolving diagram of an automatic paper-feeding device using a paper pick-up clutch according to an embodiment of the present invention.
Figure 2B:
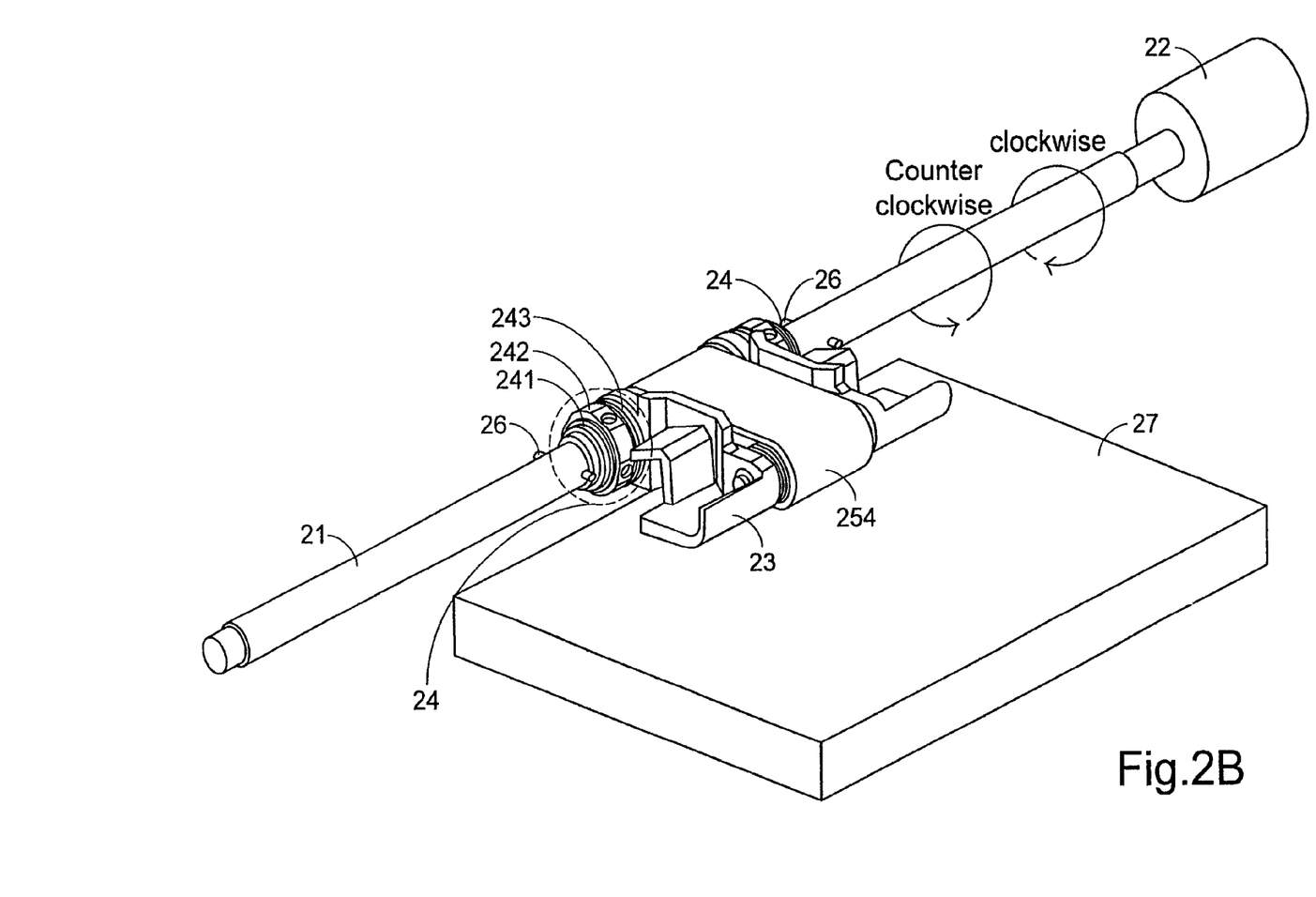
FIG. 2B is a schematic diagram showing the assembly of the automatic paper-feeding device of FIG. 2A.

Please refer to FIGS. 2A and 2B. A paper-feeding device according to an embodiment of the present invention includes a shaft 21, a motor 22, a paper-pickup clutch 24 and a paper-pickup mechanism 25. The shaft is coupled to the motor 22 and driven to rotate by the motor 22. The paper-pickup mechanism 25 includes a base 23, a first roller 251, a second roller 252 and a paper-delivering belt 254. The first roller 251 is coupled to the base 23 and sleeved on the shaft 21 along with the base 23. The second roller 252 is coupled to the base 23 via a pin 253 and stopper rings 2531, 2532. The paper-delivering belt 254 encloses the base 23, first roller 251 and second roller 252 therein. Beside the paper-pickup mechanism 25, the paper-pickup clutch 24 is arranged. The paper-pickup clutch 24 includes two sets of friction discs 243 sleeved on the shaft 21 and disposed at opposite sides of the base 23 of the paper-pickup mechanism 25, which serve as a clamping member. Each set of friction discs 243 consists of alternately arranged stainless steel plates and plastic steel plates. The stainless steel plates are used for strengthening the structure of the assembly, and the plastic steel plates provide proper buffering effects. The paper-pickup clutch 24 farther includes a clamping-force adjusting member including two screw couplers 241 having threads 2411 securely sleeved on the shaft 21 at opposite sides of the paper-pickup mechanism 25 and two screw nuts 242 movably sleeved on the screw couplers 241. In order to avoid dislocation, the screw couplers 241 and screw nuts 242 are confirmed with two bolts 26 arranged at both sides thereof.

When the shaft 21 is driven by the motor 22 to rotate in for example the clockwise direction, the first roller 251 will rotates with the shaft 21 while transmitting the paper-delivering belt 254 to rotate clockwise. Meanwhile, the second roller 252 is transmitted to rotate with the first roller 251 and paper-delivering belt 254 clockwise so as to cooperate with the other rotating elements to pick up and feed the topmost paper sheet (not shown). For allowing the paper-pickup mechanism 25 to pickup and feed paper smoothly, the clamping force of the clamping member 243 exerted on the paper-pickup mechanism 25 should not bar the rotation of the first roller 251. After the topmost paper sheet is fed, the motor 22 reverses to drive the shaft 21 to rotate counterclockwise, and the paper-pickup mechanism 25 synchronously rotate counterclockwise to rise temporarily. Then, the motor 22 reverses again to put the paper-pickup mechanism 25 down to rest on next paper sheet to be fed. For raising up the paper-pickup mechanism 25, the clamping force of the clamping member 243 exerted on the paper-pickup mechanism 25 should be great enough to bear with the weight of the paper-pickup mechanism 25.

As mentioned above, the clamping force or friction force between the clamping member 243 and paper-pickup mechanism 25 should be controlled to allow the paper-pickup mechanism 25 to sustain against paper to be fed and self-rotate with the rotation of the shaft 21 clockwise for feeding paper. Also, the clamping force or friction force between the clamping member 243 and paper-pickup mechanism 25 should be controlled to allow the paper-pickup mechanism 25 to rotate with the shaft 21 counterclockwise for releasing paper. For assuring of such critical clamping force all the time, the paper-pickup clutch 24 according to the present invention can be tuned to the optimal level.

By rotating one or both of the screw nuts 242 on respective screw couplers 241 toward the paper-pickup mechanism 25, the frictional discs 243 will be forced to urge against the paper-pickup mechanism 25 in a relatively tight manner. On the other hand, if the screw nuts 242 are rotated to move away from the paper-pickup mechanism 25, the paper-pickup mechanism 25 will be slightly released from the clamping force of the frictional discs 243. In other words, the clamping force can be easily adjusted to a desired level suitable for bidirectional clutch operation by simply rotating the screw nuts 242.

Figure 3:
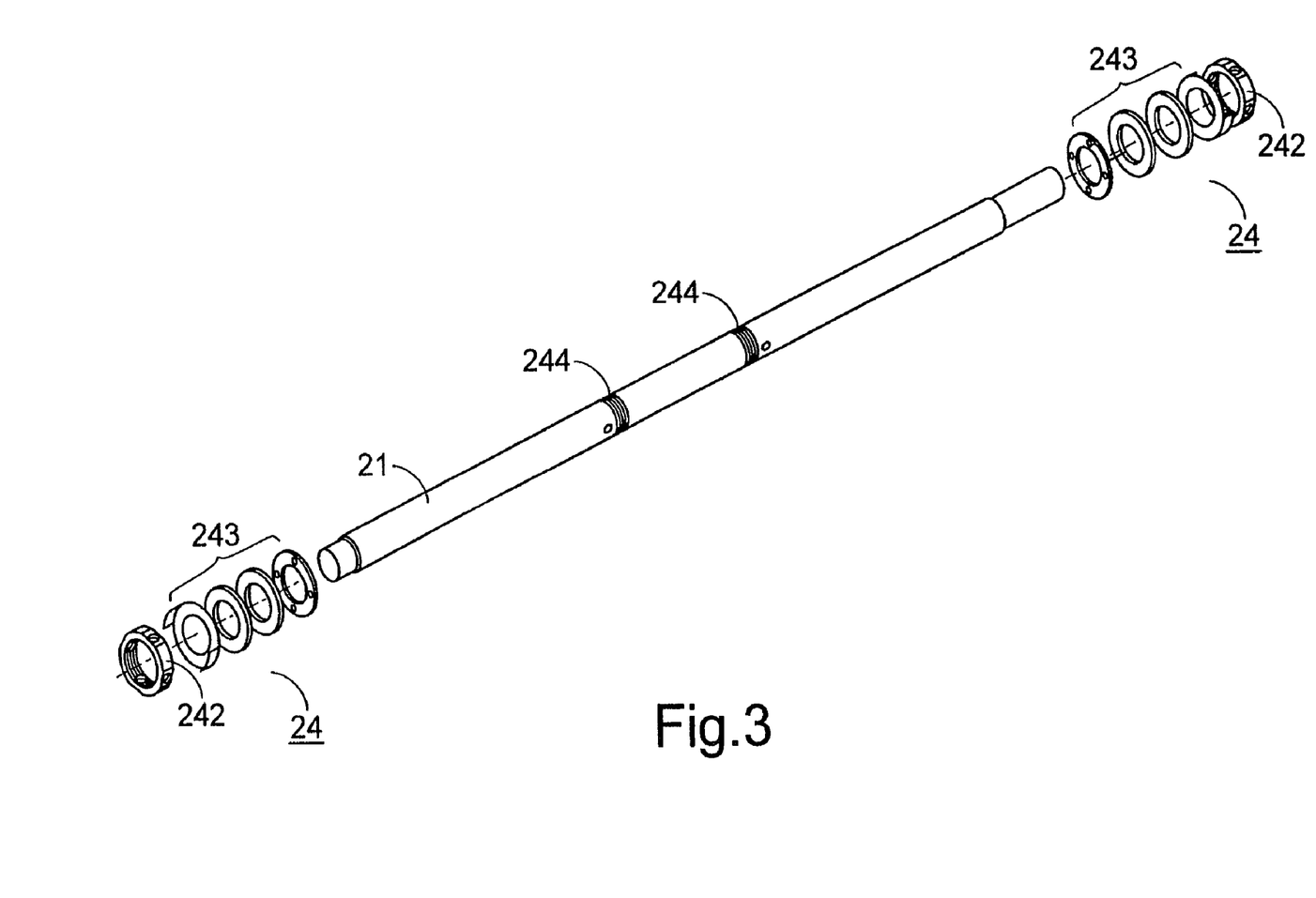
FIG. 3 is a schematic resolving diagram showing another embodiment of paper-pickup clutch according to the present invention.

While the invention has been described with reference to various embodiments, it will be understood that these embodiments are illustrative and that the scope of the invention is not limited to them. Many variations, modifications, additions and improvements of the embodiments described are possible. For example, the screw couplers 241 can be substituted by screw couplers 244 formed by directly threading on the shaft 21, as shown in FIG. 3. Likewise, the screw nuts 242 can move on the screw couplers 244 to adjust the clamping force of the clamping member 243. Further, the above embodiment is illustrated with two sets of friction discs and two sets of screwing means arranged at opposite sides of the paper-pickup mechanism. Alternatively, the clamping member and clamping-force adjusting member can be arranged at a single side of the paper-pickup mechanism while the opposite side of the paper-pickup mechanism is confined with a fixed member (not shown). Moreover, the friction discs can be formed of any suitable material in addition to the stainless and plastic stainless. The count and arrangement of the friction discs can also be freely selected depending on practical factors such as the weight of the paper-pickup mechanism. It is also feasible to have all the friction discs formed of the same material.

Variations and modifications of the embodiments disclosed herein may be made based on the description set forth herein, without departing from the scope and spirit of the invention as set forth in the following claims.

What is claimed is:

1. A paper-pickup clutch of an automatic paper-feeding device having a paper-pickup mechanism, the paper-pickup clutch comprising:
a springless clamping member sleeved on a shaft proximate the paper-pickup mechanism and exerting a clamping force thereon; and
a clamping-force adjusting member sleeved on the shaft proximate the clamping member, wherein the clamping-force adjusting member is capable of moving the clamping member toward or away from the paper-pickup mechanism in response to an external force in order to adjust the clamping force to a different level.

2. The paper-pickup clutch of claim 1, wherein the clamping member comprises a plurality of friction discs sleeved on the shaft and disposed at opposite sides of the paper-pickup mechanism.

3. The paper-pickup clutch of claim 2, wherein the plurality of friction discs comprises at least one stainless steel plate, at least one plastic plate or a combination of at least one stainless steel plate and at least one plastic plate.

4. The paper-pickup clutch of claim 2, wherein the plurality of friction discs comprises a combination of at least one stainless steel plate and at least one plastic plate that are alternately arranged about the shaft.

5. The paper-pickup clutch of claim 1, wherein the clamping-force adjusting member comprises:
screw coupler means securely sleeved on the shaft; and
screw nut means movably sleeved on the screw coupler means to a plurality of positions on the shaft for urging the clamping member against the paper-pickup mechanism in order to adjust the clamping force to the different level.

6. The paper-pickup clutch of claim 1, wherein the shaft has a threaded portion and the clamping-force adjusting member comprises screw nut means movably sleeved on the threaded portion to a plurality of positions on the shaft to urge the clamping member against the paper-pickup mechanism, in order to adjust the clamping force to the different level.

7. The paper-pickup clutch of claim 1, further comprising bolt means for confining the clamping-force adjusting member.

8. The paper-pickup clutch of claim 1, wherein the automatic paper-feeding device forms at least a part of a printer, a copier, an image scanner or a multifunctional machine.

9. An automatic paper-feeding device comprising:
a shaft;
a paper-pickup mechanism sleeved on the shaft; and
a paper-pickup clutch comprising:
a springless clamping member sleeved on the shaft proximate the paper-pickup mechanism, wherein the clamping member is capable of exerting a desired level of clamping force on the paper-pickup mechanism; and
a clamping-force adjusting member sleeved on the shaft beside the clamping member, wherein the clamping-force adjusting member is capable of moving the clamping member in relation to the paper-pickup mechanism in response to an external force in order to adjust the clamping force to the desired level.

10. The automatic paper-feeding device of claim 9, wherein the paper-pickup mechanism comprises:
a base;
a first roller coupled to the base and sleeved on and capable of rotating with the shaft;
a belt enclosing the base and the first roller, the belt caused to rotate when the first roller rotates; and
a second roller coupled to the base inside the belt and capable of rotating with the first roller via the rotation of the belt.

11. The automatic paper-feeding device of claim 9, wherein the clamping member comprises a plurality of friction discs sleeved on the shaft and disposed at opposite sides of the paper-pickup mechanism.

12. The automatic paper-feeding device of claim 11, wherein the plurality of friction discs comprises at least one stainless steel plate, at least one plastic plate or a combination of at least one stainless steel plate and at least one plastic plate.

13. The automatic paper-feeding device of claim 11, wherein the plurality of friction discs comprises a combination of at least one stainless steel plate and at least one plastic plate that are alternately arranged about the shaft.

14. The automatic paper-feeding device of claim 9, wherein the clamping-force adjusting member comprises:
at least one screw coupler securely sleeved on the shaft; and
at least one screw nut movably sleeved on the screw coupled and capable of being screwed to a plurality of positions on the shaft to urge the clamping member against the paper-pickup mechanism, thereby adjusting the clamping force to the desired level.

15. The automatic paper-feeding device of claim 9, wherein the shaft has a threaded portion and the clamping-force adjusting member comprises a screw nut movably sleeved on the threaded portion and capable of being screwed to a plurality of positions on the shaft to urge the clamping member against the paper-pickup mechanism.

16. The automatic paper-feeding device of claim 9, further comprising at least one bolt for confining the clamping-force adjusting member.

17. The automatic paper-feeding device of claim 9, for use in a printer, a copier, an image scanner, or a multifunctional machine.

18. A method for feeding paper in an automatic paper-feeding device having a paper-pickup mechanism, the method comprising:
   urging the paper-pickup mechanism against the paper to be fed;
   exerting a desired level of clamping force on the paper-pickup mechanism with a paper-pickup clutch, the paper-pickup clutch comprising:
      a springless clamping member sleeved on a shaft proximate the paper pickup mechanism and exerting the clamping force thereon; and
      a clamping-force adjusting member sleeved on the shaft proximate the clamping member, wherein the clamping-force adjusting member is capable of moving the clamping member in relation to the paper-pickup mechanism in response to an external force in order to adjust the clamping force to the desired level.

19. The method of claim 18, wherein the paper-pickup mechanism comprises:
   a base;
   a first roller coupled to the base and sleeved on and capable of rotating with the shaft;
   a belt enclosing the base and the first roller, the belt caused to rotate when the first roller rotates; and
   a second roller coupled to the base inside the belt and capable of rotating with the first roller via the rotation of the belt.

20. The method of claim 18, wherein the clamping member comprises a plurality of friction discs sleeved on the shaft and disposed at opposite sides of the paper-pickup mechanism.

21. The method of claim 20, wherein the plurality of the friction discs comprises at least one stainless steel plate, at least one plastic plate or a combination of at least one stainless steel plate and at least one plastic plate.

22. The method of claim 20, wherein the plurality of friction discs comprises a combination of at least one stainless steel plate and at least one plastic plate that are alternately arranged about the shaft.

23. The method of claim 18, wherein the clamping-force adjusting member comprises:
   at least one screw coupler securely sleeved on the shaft; and
   at least one screw nut movably sleeved on the screw coupler and capable of being screwed to a plurality of positions on the shaft to urge the clamping member against the paper-pickup mechanism, thereby adjusting the clamping force to the desired level.

24. The method of claim 18, wherein the shaft has a threaded portion and the clamping-force adjusting member comprises a screw nut movably sleeved on the threaded portion and capable of being screwed to a plurality of positions on the shaft to urge the clamping member against the paper-pickup mechanism.

25. The method of claim 18, further comprising at least one bolt for confining the clamping-force adjusting member.

26. The method of claim 18, further comprising:
   rotating the shaft and the paper-pickup mechanism in a first direction to feed the paper.

27. The method of claim 26, further comprising:
   rotating the shaft and the paper-pickup mechanism in a second direction to release the paper.

28. A paper-pickup clutch of an automatic paper-feeding device having a paper-pickup mechanism, the paper-pickup clutch comprising:
   springless means for clamping sleeved on a shaft proximate the paper-pickup mechanism and exerting a clamping force thereon; and
   means for adjusting sleeved on the shaft proximate the springless means for clamping, wherein the means for adjusting is capable of moving the springless means for clamping toward or away from the paper-pickup mechanism in response to an external force in order to adjust the clamping force to a selected level.

29. The paper-pickup clutch of claim 28, wherein the springless means for clamping comprises a plurality of friction discs sleeved on the shaft and disposed at opposite sides of the paper-pickup mechanism.

30. The paper-pickup clutch of claim 29, wherein the plurality of friction discs comprises at least one stainless steel plate, at least one plastic plate or a combination of at least one stainless steel plate and at least one plastic plate.

31. The paper-pickup clutch of claim 29, wherein the plurality of friction discs comprises a combination of at least one stainless steel plate and at least one plastic plate that are alternately arranged about the shaft.

32. The paper-pickup clutch of claim 28, wherein the means for adjusting comprises:
   screw coupler means securely sleeved on the shaft; and
   screw nut means movably sleeved on the screw coupler means to a plurality of positions on the shaft for urging the springless means for clamping against the paper-pickup mechanism in order to adjust the clamping force to the selected level.

33. The paper-pickup clutch of claim 28, wherein the shaft has a threaded portion and the means for adjusting comprises screw nut means movably sleeved on the threaded portion to a plurality of positions on the shaft to urge the springless means for clamping against the paper-pickup mechanism, in order to adjust the clamping force to the selected level.

34. The paper-pickup clutch of claim 28, further comprising bolts means for confining the means for adjusting.

35. The paper-pickup clutch of claim 28, wherein the automatic paper-feeding device forms at least a part of a printer, a copier, an image scanner or a multifunctional machine.

36. An automatic paper-feeding device comprising:
   a shaft;
   a paper-pickup mechanism sleeved on the shaft; and
   a paper-pickup clutch comprising:
      springless means for clamping sleeved on the shaft proximate the paper-pickup mechanism, wherein the springless means for clamping is capable of exerting a desired level of clamping force on the paper-pickup mechanism; and
      means for adjusting sleeved on the shaft beside the springless means for clamping, wherein the means for adjusting is capable of moving the springless means for clamping in relation to the paper-pickup mechanism in response to an external force in order to adjust the clamping force to the desired level.

37. The automatic paper-feeding device of claim 36, wherein the paper-pickup mechanism comprises:
   a base;
   a first roller coupled to the base and sleeved on and capable of rotating with the shaft;

a belt enclosing the base and the first roller, the belt caused to rotate when the first roller rotates; and a second roller coupled to the base inside the belt and capable of rotating with the first roller via the rotation of the belt.

38. The automatic paper-feeding device of claim 36, wherein the springless means for clamping comprises a plurality of friction discs sleeved on the shaft and disposed at opposite sides of the paper-pickup mechanism.

39. The automatic paper-feeding device of claim 38, wherein the plurality of the friction discs comprises at least one stainless steel plate, at least one plastic plate or a combination of at least one stainless steel plate and at least one plastic plate.

40. The automatic paper-feeding device of claim 38, wherein the plurality of friction discs comprises a combination of at least one stainless steel plate and at least one plastic plate that are alternately arranged about the shaft.

41. The automatic paper-feeding device of claim 36, wherein the means for adjusting comprises:

at least one screw coupler securely sleeved on the shaft; and at least one screw nut movably sleeved on the screw coupler and capable of being screwed to a plurality of positions on the shaft to urge the springless means for clamping against the paper-pickup mechanism, thereby adjusting the clamping force to the desired level.

42. The automatic paper-feeding device of claim 36, wherein the shaft has a threaded portion and the means for adjusting comprises a screw nut movably sleeved on the threaded portion and capable of being screwed to a plurality of positions on the shaft to urge the springless means for clamping against the paper-pickup mechanism.

43. The automatic paper-feeding device of claim 36, further comprising at least one bolt for confining the means for adjusting.

44. The automatic paper-feeding device of claim 36, for use in a printer, a copier, an image scanner, or a multifunctional machine.

* * * * *